US010173473B2

(12) United States Patent
Otani et al.

(10) Patent No.: US 10,173,473 B2
(45) Date of Patent: Jan. 8, 2019

(54) PNEUMATIC MOTORCYCLE TIRE (71) Applicants: SUMITOMO RUBBER INDUSTRIES, LTD., Kobe-shi, Hyogo (JP); THE GOODYEAR TIRE & RUBBER COMPANY, Akron, OH (US)

(72) Inventors: Masafumi Otani, Kobe (JP); Sebastien Willy Fontaine, Akron, OH (US); Armand Rene Gabriel Leconte, Akron, OH (US); Julien Michel Sylvain Seguy, Akron, OH (US); Jean-Luc Faure, Akron, OH (US); Auguste Elichiry, Akron, OH (US)

(73) Assignees: SUMITOMO RUBBER INDUSTRIES, LTD., Kobe-Shi, Hyogo (JP); THE GOODYEAR TIRE & RUBBER COMPANY, Akron, OH (US)

( * ) Notice: Subject to any disclaimer, the term of this patent is extended or adjusted under 35 U.S.C. 154(b) by 91 days.

(21) Appl. No.: 15/011,045

(22) Filed: Jan. 29, 2016

(65) Prior Publication Data
US 2016/0221399 A1 Aug. 4, 2016

(30) Foreign Application Priority Data

Jan. 30, 2015 (JP) .................. 2015-017941

(51) Int. Cl.
*B60C 11/03* (2006.01)
(52) U.S. Cl.
CPC ........ *B60C 11/0302* (2013.01); *B60C 11/033* (2013.01); *B60C 2011/0334* (2013.01);
(Continued)

(58) Field of Classification Search
CPC ............ B60C 11/0327; B60C 11/0302; B60C 2011/0334; B60C 2011/0374;
(Continued)

(56) References Cited
U.S. PATENT DOCUMENTS 5,358,020 A * 10/1994 Haas .................. B60C 11/0311
152/209.11
D717,724 S * 11/2014 Fontaine ................... D12/535
(Continued)

FOREIGN PATENT DOCUMENTS

JP 2013-519563 A 5/2013
WO WO 2011/098406 A1 8/2011

*Primary Examiner* — Matthew J Daniels
*Assistant Examiner* — Yunju Kim
(74) *Attorney, Agent, or Firm* — Birch, Stewart, Kolasch & Birch, LLP (57) ABSTRACT

A pneumatic motorcycle tire includes a tread portion provided in each half tread region with a unit pattern repeatedly arranged in the tire circumferential direction to form a unidirectional tread pattern. The unit pattern includes a first groove extending axially outwardly from a vicinity of the tire equator, while inclining to the opposite direction to the intended tire rotational direction; a second groove disposed on the heel-side in the tire rotational direction of the first groove and extending along the first groove; a third groove disposed on the heel-side of the second groove and extending along the second groove; a fourth groove disposed on the heel-side of the third groove and extending along the third groove; and a narrow groove extending from an axially inner end of the first groove to an axially inner end of the fourth groove, while inclining to the intended tire rotational direction.

22 Claims, 4 Drawing Sheets

(52) U.S. Cl.
CPC ............... *B60C 2011/0374* (2013.01); *B60C 2011/0376* (2013.01); *B60C 2011/0379* (2013.01); *B60C 2200/10* (2013.01)

(58) Field of Classification Search
CPC ..... B60C 2011/0376; B60C 2011/0379; B60C 2200/10; B60C 11/03
USPC ............ 152/209.25, 209.8, 209.11; D12/535
See application file for complete search history.

(56) References Cited

U.S. PATENT DOCUMENTS

| | | | |
|---|---|---|---|
| 2012/0060988 A1* | 3/2012 | Otani | B60C 11/0311 152/209.8 |
| 2012/0160380 A1* | 6/2012 | Otani | B60C 11/0302 152/209.11 |
| 2013/0206297 A1 | 8/2013 | Bestgen | |
| 2013/0228256 A1* | 9/2013 | Shibamoto | B60C 11/0304 152/209.8 |

* cited by examiner

PNEUMATIC MOTORCYCLE TIRE

BACKGROUND OF THE INVENTION

The present invention relates to a pneumatic motorcycle tire, more particularly to a tread pattern capable of improving drainage performance and handling stability in good balance.

In recent years, with the developments of expressway network and high power motorcycles, pneumatic tires for such motorcycles are required to have highly improved controllability or handling stability.

Figure 2:
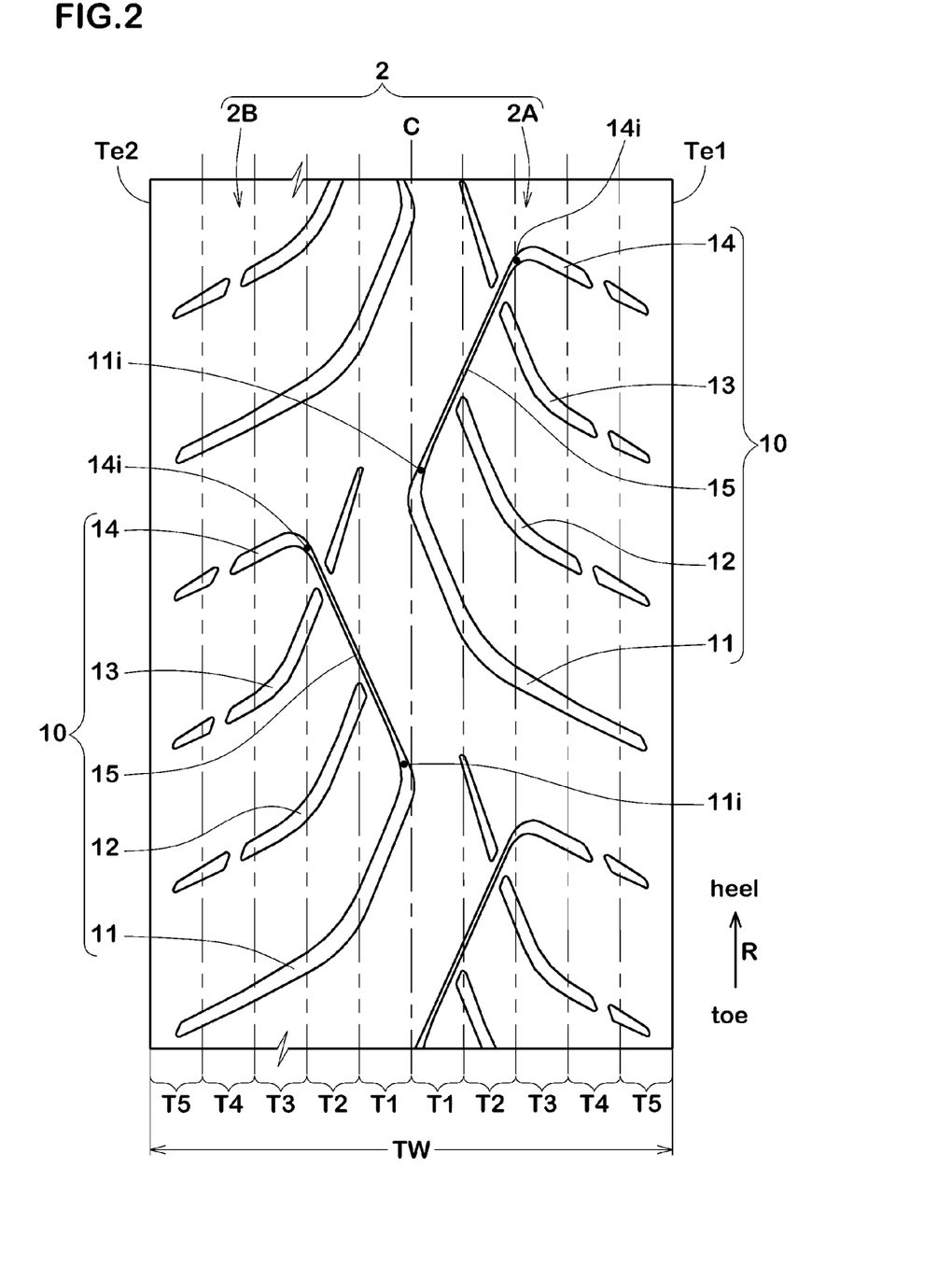
FIG. 2 is a developed partial view of the tread portion thereof showing an example of the tread pattern according to the present invention.

For example, in Japanese patent application publication No. 2013-519563 (corresponding to WO2011/098406A1), a pneumatic motorcycle tire is disclosed, wherein the tread pattern shown in FIG. 2 comprises wide oblique grooves extending from the tire equator to the tread edges, and narrow oblique grooves extending therealong in order to improve the grip performance. The axially inner ends of the narrow oblique grooves are positioned in the tread shoulder portions, namely, the narrow oblique grooves do not extend to a vicinity of the tire equator. Therefore, the rigidity of the tread portion becomes relatively high in the tread crown portion. As a result, during straight running, the tread crown portion can not deflect sufficiently to absorb shocks and vibrations caused by rough road surfaces, and the ride comfort and handling stability may be affected.

SUMMARY OF THE INVENTION

It is therefore, an object of the present invention to provide a pneumatic motorcycle tire, in which the shock absorbing performance is improved to improve the ride comfort and handling stability.

According to the present invention, a pneumatic motorcycle tire comprises a tread portion having a right tread edge and a left tread edge and provided with a unidirectional tread pattern for which an intended tire rotational direction is specified whereby a heel-side toward the intended tire rotational direction and a toe-side toward the opposite direction to the intended tire rotational direction is defined, wherein a right half tread of the tread portion defined between the tire equator and the right tread edge and a left half tread of the tread portion defined between the tire equator and the left tread edge are each provided with a unit pattern repeatedly arranged in the tire circumferential direction so as to form the unidirectional tread pattern, and the unit pattern comprises a first oblique groove extending axially outwardly from a vicinity of the tire equator, while inclining to the opposite direction to the intended tire rotational direction, a second oblique groove disposed on the heel-side in the tire rotational direction of the first oblique groove and extending along the first oblique groove, a third oblique groove disposed on the heel-side in the tire rotational direction of the second oblique groove and extending along the second oblique groove, a fourth oblique groove disposed on the heel-side in the tire rotational direction of the third oblique groove and extending along the third oblique groove, and a narrow oblique groove extending from an axially inner end of the first oblique groove to an axially inner end of the fourth oblique groove, while inclining to the intended tire rotational direction.

The pneumatic motorcycle tire according to the present invention may further include the following features (A)-(E):

(A) the angle of the narrow oblique groove with respect to the tire circumferential direction is in a range of more than 0 degree and not more than 35 degrees;

(B) the groove depth of the narrow oblique groove is in a range of from 30% to 70% of the groove depth of the first oblique groove;

(C) the groove width of the narrow oblique groove is in a range of from 1.5 to 2.5 mm;

(D) the axial distance from the tire equator to an axially inner end of the fourth oblique groove to which the narrow oblique groove is connected, is not less than 20 mm;

(E) if the developed axial width of each of the right and left half treads is divided into five equal parts which are a first region, a second region, a third region, a fourth region and a fifth region arranged in this order from the tire equator to the tread edge, in each of the right and left half treads, land ratios S1, S2, S3, S4 and S5 (%) of the respective first-fifth regions satisfy the following conditions (1)-(4)

$$S1 >= 85 \tag{1}$$

$$S1 > S2 \tag{2}$$

$$S1 - S2 = <7 \text{ and} \tag{3}$$

$$S2 < S3 < S4 < S5. \tag{4}$$

Therefore, in the pneumatic motorcycle tire according to the present invention, since the axially inner ends of the first oblique grooves and the axially inner ends of the narrow oblique grooves are positioned near the tire equator, the tread portion can appropriately deflect near the tire equator. Further, the narrow oblique groove, which inclines to the opposite direction to the first oblique groove, is connected to the axially inner end of the fourth oblique groove, therefore, the tread portion can sufficiently deflect near the edges in the tire axial direction of the ground contacting patch during straight running. Thereby, the shock absorbing performance during running on rough road surfaces is improved, and the ride comfort and handling stability are also improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load. The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like.

DESCRIPTION OF PREFERRED EMBODIMENT

An embodiment of the present invention will now be described in detail in conjunction with the accompanying drawings.

Figure 1:
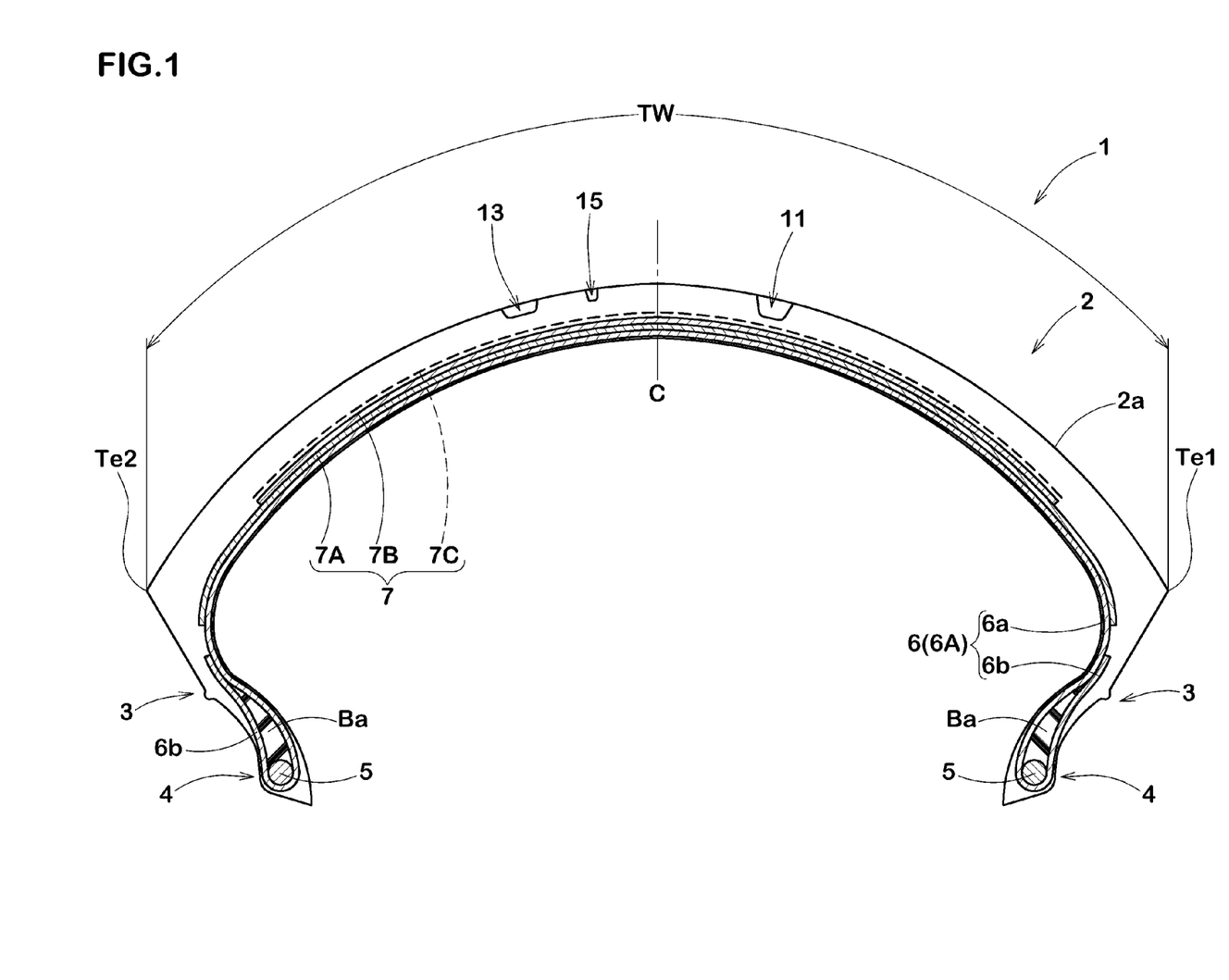
FIG. 1 is a cross sectional view of a pneumatic motorcycle tire as an embodiment of the present invention under the normally inflated unloaded condition.

As shown in FIG. 1, the pneumatic motorcycle tire 1 according to the present invention comprises a tread portion 2, a pair of axially spaced bead portions 4 each with a bead core 5 therein, a pair of sidewall portions 3 extending between the tread edges Te1 and Te2 and the bead portions 4, a carcass 6 extending between the bead portions 4, and a tread reinforcing cord layer 7 disposed radially outside the carcass 6 in the tread portion 2.

As a characteristic of a motorcycle tire, the tread portion 2 (inclusive of the carcass 6, the tread reinforcing cord layer 7 and a tread rubber thereon) is convexly curved so that the tread face 2a or the outer surface of the tread portion 2 between the tread edges Te1 and Te2 is curved like an arc swelling radially outwardly, and the maximum cross sectional width of the tire 1 occurs between the tread edges Te1 and Te2, namely, equals to the axial tread width.

In this embodiment, the tire 1 is designed for a large displacement touring motorcycle having a lot of opportunity to travel with relatively small bank angles for a long time.

The carcass 6 in this example is composed of a single ply 6A of cords arranged at an inclination angle in a range of from 75 to 90 degrees, more preferably 80 to 90 degrees with respect to the tire equator C.

The carcass ply 6A extends between the bead portions 4 through the tread portion 2 and the sidewall portions 3, and is turned up around the bead core 5 in each bead portion 4 so as to form a pair of turned up portions 6b and a main portion 6a therebetween. For the carcass cords, organic fiber cords, e.g. nylon, polyester, rayon and the like can be suitably used.

Between the main portion 6a and the turned up portion 6b in each of the bead portions 4, a bead apex Ba made of hard rubber is disposed.

The tread reinforcing layer 7 comprises a belt composed of at least one ply, in this embodiment, two radially inner and outer cross plies 7A and 7B of cords laid at an inclination angle in a range of from 5 to 40 degrees with respect to the tire equator C, for example.

For the belt cords, for example, steel cords, aramid cords, rayon cords and the like can be suitably used.

In this embodiment, the tread reinforcing layer 7 further includes a band ply 7C disposed on the radially outside of the belt or the radially outermost belt ply 7B.

The band ply 7C is formed by spirally winding at least one band cord on the radially outermost belt ply 7B, namely, composed of the spiral windings of the band cord(s).

The band ply 7c suppresses the lifting of the tread portion 2 during high speed running, and increases the circumferential rigidity of the tread portion The motorcycle tire 1 provided in the tread portion 2 with such band ply 7C can be suitably used as a drive axle tire, namely, rear tire of a motorcycle with large engine displacement generating a large drive torque.

The motorcycle tire 1 according to the present invention is not limited to a radial ply tire. The tire 1 may be constructed as a bias ply tire.

In this embodiment, as shown in FIG. 2, the tread portion 2 is provided with a unidirectional tread pattern for which an intended tire rotational direction R is specified.

In each of a right half tread 2A and a left half tread 2B of the tread portion 2, a unit pattern 10 is arranged repeatedly in the tire circumferential direction to form the tread pattern. The right half tread 2A is defined between the tire equator C and the right tread edge Te1. The left half tread 2B is defined between the tire equator C and the left tread edge Te2.

Figure 3:
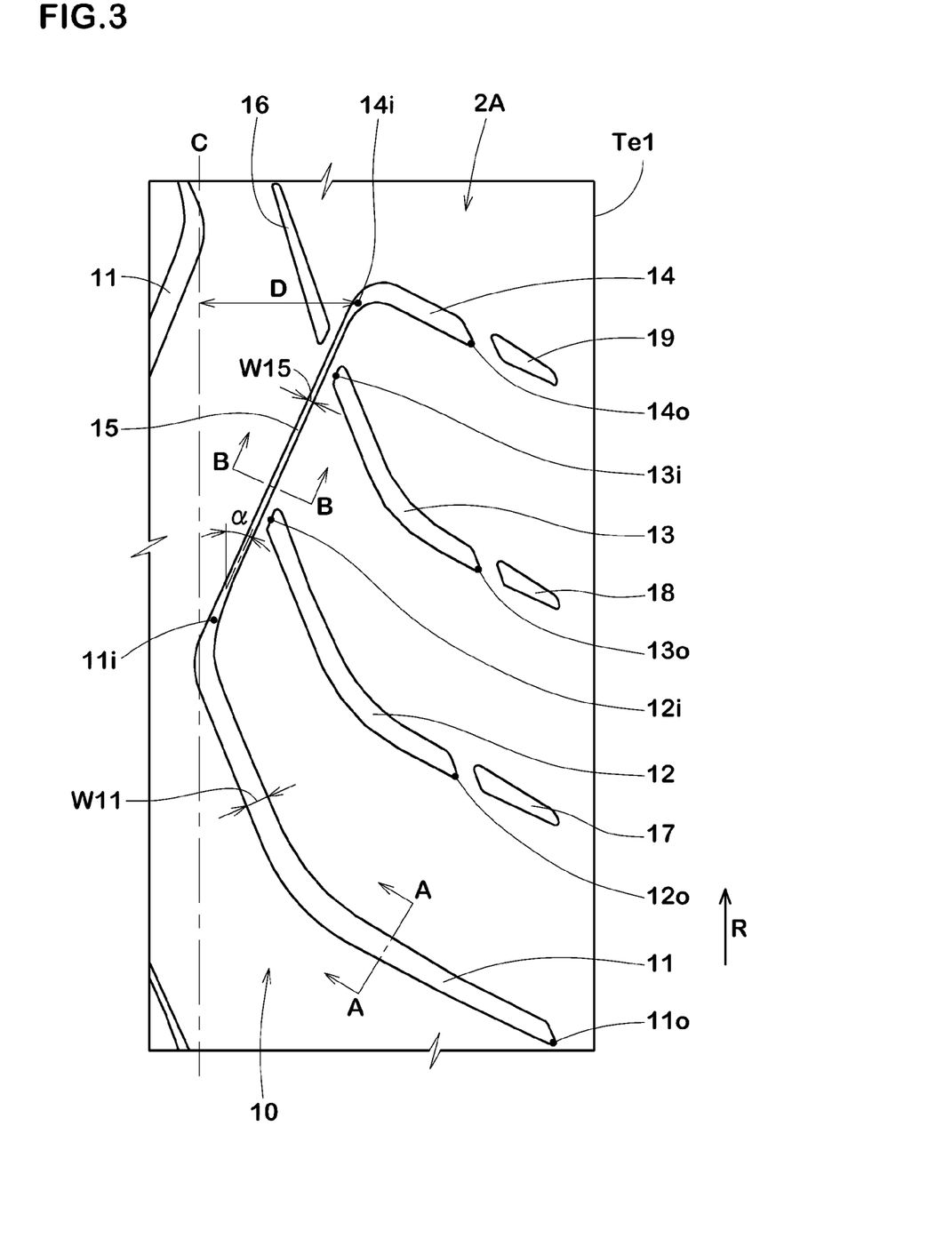
FIG. 3 shows a unit pattern of the tread pattern shown in FIG. 2.

In this embodiment, as shown in FIGS. 2 and 3, the unit pattern 10 comprises a first oblique groove 11, a second oblique groove 12, a third oblique groove 13, a fourth oblique groove 14, and a narrow oblique groove 15.

The first oblique groove 11 extends axially outwardly from the vicinity of the tire equator C, while inclining to the opposite direction to the tire rotational direction R.

The first oblique groove 11 has an axially inner end 11i near the tire equator C, and an axially outer end 11o terminating near the tread edge without reaching to the tread edge.

The second oblique groove 12 is disposed on the heel-side in the tire rotational direction R of the first oblique groove 11 and extends therealong. It may be not indispensable that the second oblique groove 12 is exactly in parallel with the first oblique groove 11.

The second oblique groove 12 has an axially inner end 12i terminating without being connected to the narrow oblique groove 15, and an axially outer end 12o terminating without reaching to the tread edge.

The inner end 12i is positioned axially outside the inner end 11i of the first oblique groove 11.

The inner end 12i is positioned on the axially outside of the narrow oblique groove 15.

The outer end 12o is positioned axially inside the outer end 11o of the first oblique groove 11.

The length of the second oblique groove 12 measured along the widthwise center line is shorter than the length of the first oblique groove 11 measured along the widthwise center line.

The third oblique groove 13 is disposed on the heel-side in the tire rotational direction R of the second oblique groove 12 and extends therealong.

The third oblique groove 13 has an axially inner end 13i terminating without being connected to the narrow oblique groove 15, and an axially outer end 13o terminating without reaching to the tread edge.

The inner end 13i is positioned axially outside the inner end 12i of the second oblique groove 12.

The inner end 13i is positioned on the axially outside of the narrow oblique groove 15.

The outer end 13o is positioned axially inside the outer end 12o of the second oblique groove 12.

The length of the third oblique groove 13 measured along the widthwise center line is shorter than the length of the second oblique groove 12 measured along the widthwise center line.

The fourth oblique groove 14 is disposed on the heel-side in the tire rotational direction R of the third oblique groove 13, and extends therealong.

The fourth oblique groove 14 has an axially inner end 14i connected to the narrow oblique groove 15, and an axially outer end 14o terminating without reaching to the tread edge. The inner end 14*i* is positioned axially outside the inner end 13*i* of the third oblique groove 13.

The outer end 14*o* is positioned axially inside the outer end 13*o* of the third oblique groove 13.

The length of the fourth oblique groove 14 measured along the widthwise center line is shorter than the length of the third oblique groove 13 measured along the widthwise center line.

The narrow oblique groove 15 is extended from the axially inner end 11*i* of the first oblique groove 11, while inclining to the opposite direction to the inclining direction of the first oblique groove 11, namely, to the tire rotational direction R, and then connected to the axially inner end 14*i* of the fourth oblique groove 14.

Accordingly, in the unit pattern 10, the first oblique groove 11 and the fourth oblique groove 14 are connected with each other through the narrow oblique groove 15.

The first oblique groove 11 and the narrow oblique groove 15 are connected with each other through a curved portion where the groove depth and the groove width are smoothly changed from one to the other.

Similarly, the fourth oblique groove 14 and the narrow oblique groove 15 are connected with each other through a curved portion where the groove depth and the groove width are smoothly changed from one to the other.

Owing to such unit pattern 10, the axially inner ends 11*i* of the first oblique grooves 11, namely, the axially inner ends of the narrow oblique grooves 15 are positioned in the vicinity of the tire equator C.

Further, the narrow oblique groove 15 connecting between the inner end 11*i* of the first oblique groove 11 and the inner end 14*i* of the fourth oblique groove 14, can appropriately reduce the rigidity of the tread portion 2 in the vicinity of the tire equator C.

Therefore, the tread portion 2 can sufficiently deflect in the ground contacting patch during straight running to improve the shock absorbing performance during running on rough road surfaces. Thus, the ride comfort and handling stability can be improved.

Since the narrow oblique groove 15 is inclined to the opposite direction to the inclining direction of the first-fourth oblique grooves 11-14, the narrow oblique groove 15 can mitigate a stepped variation in the circumferential rigidity caused by the first-fourth oblique grooves 11-14, and the rigidity of the tread portion 2 is optimized to further improve the shock absorbing performance.

The narrow oblique groove 15 in this example is straight. But, the narrow oblique groove 15 can be curved in the form of an arc having a large radius, for example, 400 mm or more.

As shown in FIG. 3, the angle $\alpha$ of the narrow oblique groove 15 with respect to the tire circumferential direction is preferably set in a range of more than 0 degrees and not more than 35 degrees.

If the angle $\alpha$ is less than 0 degree, namely, inclined to the opposite direction, since the fourth oblique groove 14 extends across the tire equator C, the rigidity of the tread portion 2 is decreased in the vicinity of the tire equator C, and there is a possibility that the grip performance during straight running is deteriorated.

If the angle $\alpha$ is more than 35 degrees, there is a possibility that the rigidity of the tread portion 2 becomes excessively high in the vicinity of the tire equator c, and the tread portion 2 becomes hard to deflect near tread edges during straight running. As a result, shock absorbing performance during running on rough road surfaces is deteriorated. Further, there is a possibility that drainage performance during running on wet road surfaces is deteriorated.

Figure 4A:
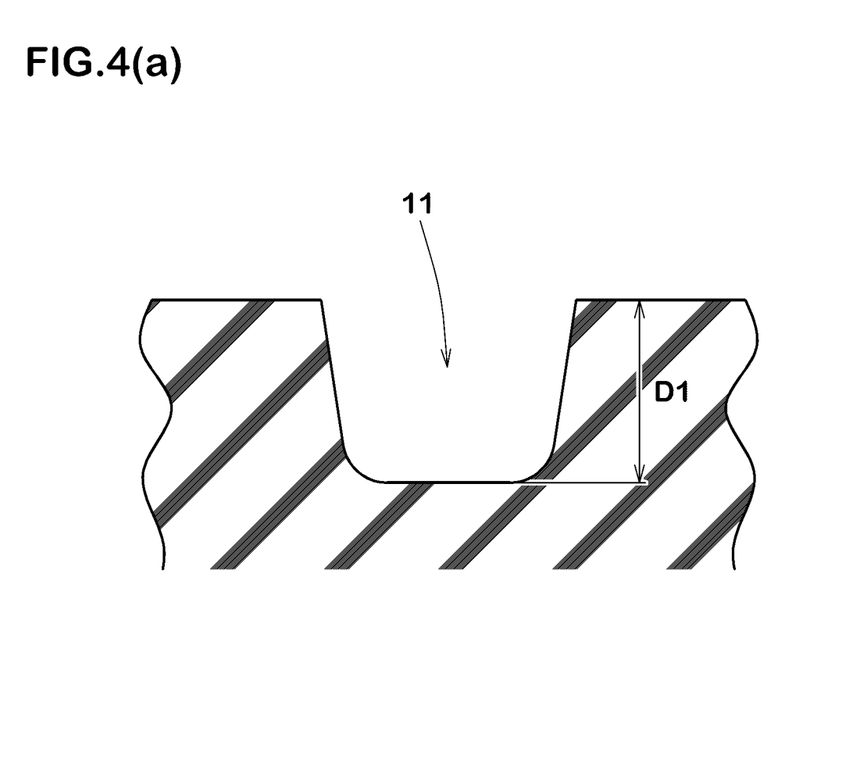
FIG. 4(a) is a cross sectional view of a first oblique groove taken along line A-A in FIG. 3.
Figure 4B:
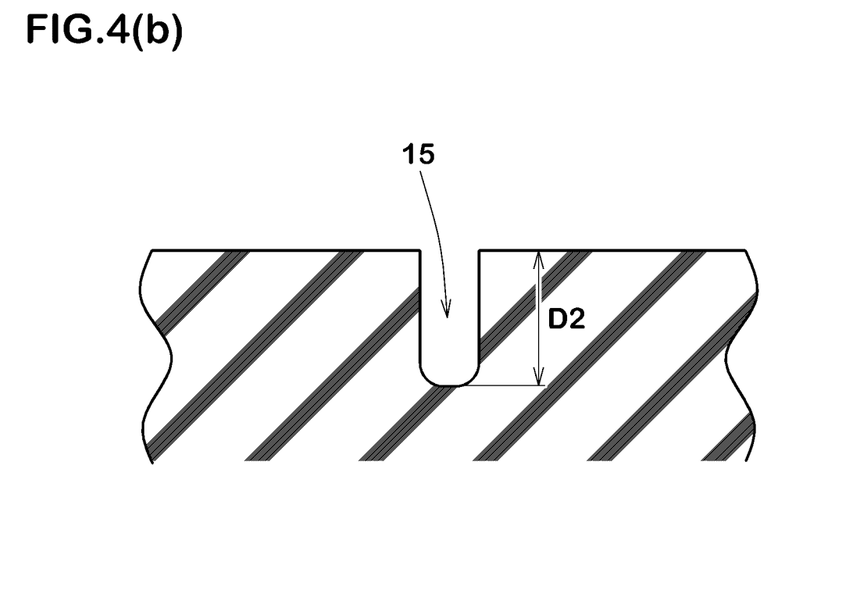
FIG. 4(b) is a cross sectional view of a narrow oblique groove taken along line B-B in FIG. 3.

In view of the handling stability on dry road surfaces and the drainage performance on wet road surfaces, it is preferable that, as shown in FIG. 4(*a*), the groove depth D1 of the first oblique groove 11 is set in a range of from 5 to 9 mm. It is preferable that, as shown in FIG. 4(*b*), the groove depth D2 of the narrow oblique groove 15 is set in a range of from 30% to 70% of the groove depth D1 of the first oblique groove 11.

If the groove depth D2 is less than 30% of the groove depth D1, the rigidity of the tread portion 2 becomes high in the vicinity of the tire equator C, and there is a possibility that the shock absorbing performance during running on rough road surfaces is deteriorated. Further, the drainage performance during running straight on wet road surfaces is liable to deteriorate.

If the groove depth D2 is more than 70% of the groove depth D1, the rigidity of the tread portion 2 is decreased in the vicinity of the tire equator C, and there is a possibility that the grip performance during straight running is deteriorated. Further, the groove depth D1 of the first oblique groove 11 becomes insufficient, and the drainage performance during cornering is liable to deteriorate.

Further, it is preferable that, as shown in FIG. 3, the groove width w15 of the narrow oblique groove 15 is set in a range of from 1.5 to 2.5 mm.

If the groove width w15 is less than 1.5 mm, the rigidity of the tread portion 2 is increased in the vicinity of the tire equator C, and there is a possibility that the shock absorbing performance during running on rough road surfaces is deteriorated. Further, the drainage performance during running straight on wet road surfaces is liable to deteriorate. Furthermore, the radius of curvature of the groove bottom becomes excessively small, and cracks are liable to occur in the groove bottom.

If the groove width w15 is more than 2.5 mm, the rigidity of the tread portion 2 is decreased in the vicinity of the tire equator C, and there is a possibility that the grip performance during straight running is deteriorated.

The groove width w15 of the narrow oblique groove 15 is preferably set in a range of from 25% to 42% of the groove width w11 of the first oblique groove 11.

If the groove width w15 is less than 25% of the groove width w11, the rigidity of the tread portion 2 becomes high in the vicinity of the tire equator C, and there is a possibility that the shock absorbing performance during running on rough road surfaces is deteriorated. Further, the drainage performance during running straight on wet road surfaces is liable to deteriorate.

If the groove width w15 is more than 42% of the groove width w11, the rigidity of the tread portion 2 is decreased in the vicinity of the tire equator C, and there is a possibility that the grip performance during straight running is deteriorated.

It is preferable that, as shown in FIG. 3, the axial distance D from the tire equator C to the inner end 14*i* of the fourth oblique groove 14 to which the narrow oblique groove 15 is connected, is not less than 20 mm.

If the distance D is less than 20 mm, the rigidity of the tread portion 2 is decreased in the vicinity of the tire equator C, and there is a possibility that the grip performance during straight running is deteriorated.

More preferably, the distance D is set in a range of not less than 30 mm in view of optimization of the above-mentioned rigidity of the tread portion 2.

The unit pattern 10 in this embodiment further includes a fifth oblique groove 16, a sixth oblique groove 17, a seventh oblique groove 18 and an eighth oblique groove 19.

The fifth oblique groove 16 is disposed on the axially inside of the narrow oblique groove 15, namely, on the opposite side of the third oblique groove 13 through the narrow oblique groove 15. The fifth oblique groove 16 extends axially inwardly from a position near the narrow oblique groove 15 along an extension of an axially inner linear part of the third oblique groove 13, and terminates without reaching to the tire equator C.

The sixth oblique groove 17 is disposed axially outside the second oblique groove 12. The sixth oblique groove 17 extends axially outwardly from a position near the outer end 12o of the second oblique groove 12 along an extension of an axially outer linear part of the second oblique groove 12, and terminates without reaching to the tread edge Te1, Te2.

The seventh oblique groove 18 is disposed axially outside the third oblique groove 13. The seventh oblique groove 18 extends axially outwardly from a position near the outer end 13o of the third oblique groove 13 along an extension of an axially outer linear part of the third oblique groove 13, and terminates without reaching to the tread edge Te1, Te2.

The eighth oblique groove 19 is disposed axially outside the fourth oblique groove 14. The eighth oblique groove 19 extends axially outwardly from a position near the outer end 14o of the fourth oblique groove 14 along an extension of the fourth oblique groove 14, and terminates without reaching to the tread edge Te1, Te2.

By the fifth oblique groove 16, sixth oblique groove 17, seventh oblique groove 18 and eighth oblique groove 19, the distribution of the rigidity of the tread portion 2 is further optimized, and the drainage performance on wet road surfaces can be further improved.

If the developed axial width (TW/2) of each of the right and left half treads 2A and 2B is divided into five equal parts which are a first region T1, a second region T2, a third region T3, a fourth region T4 and a fifth region T5 arranged in this order from the tire equator C to tread edge as shown in FIG. 2, it is preferable that, in each of the right half tread 2A and the left half tread 2B, land ratios S1, S2, S3, S4 and S5 (%) of the first-fifth regions T1, T2, T3, T4 and T5, respectively, satisfy the following conditions (1)-(4):

$$S1 >= 85 \quad (1)$$

$$S1 > S2 \quad (2)$$

$$S1 - S2 =< 7 \text{ and} \quad (3)$$

$$S2 < S3 < S4 < S5. \quad (4)$$

As to the condition (1), if the land ratio S1 of the first region T1 is less than 85%, the rigidity of the tread portion 2 in the vicinity of the tire equator C is decreased, and there is a possibility that wear resistance during straight running is deteriorated.

By satisfying the condition (2), the drainage performance when the camber angle is small can be increased, while maintaining the wear resistance during straight running, and the handling response on wet road surfaces can be improved.

By satisfying the condition (3), transitional characteristics, for example relating to the grip performance, when initiating turning or cornering (the bank angle is almost zero) can be made steady, and the handling stability is improved. Further, in order that the transitional characteristics is made steady from the state when initiating cornering to a state when the bank angle is increased, it is preferable that the difference S1−S2 is less than 7 (S1−S2<7).

By satisfying the condition (4), the transitional characteristics can be made steady from the state when initiating cornering to a state when the tire 1 or the motorcycle is fully leant (the bank angle is almost maximum). Further, a reaction force from the road surface is gradually increased with the increase in the bank angle, and as a result, the handling stability can be improved.

As shown in FIGS. 2 and 3, in this embodiment, the axially inner end 11i of the first oblique groove 11 is positioned in the region T1. The axially inner end 12i of the second oblique groove 12 near the boundary between the regions T1 and T2. The axially inner end 13i of the third oblique groove 13 is positioned in the region T2. The axially inner end 14i of the fourth oblique groove 14 is near the boundary between the regions T2 and T3. The axially outer ends 11o, 12o, 13o and 14o of the oblique grooves 11, 12, 13 and 14 are positioned in the region T4.

The axially inner ends of the sixth oblique groove 17, the seventh oblique groove 18 and the eighth oblique groove 19, are positioned in the fourth region T4.

The axially outer ends of the oblique grooves 17, 18 and 19 are positioned in the fifth region T5.

The axially outer end of the fifth oblique groove 16 is positioned in the second region T2.

The axially inner end of the fifth oblique groove 16 near the boundary between the regions T1 and T2.

Comparison Tests

Based on the structure shown in FIG. 1 and the tread pattern shown in FIG. 2, motorcycle tires of size 180/55ZR17 (rim size 5.5×17) were experimentally manufactured according to specifications listed in Table 1, and tested for the ride comfort, handling stability and drainage performance as follows.

<Ride Comfort and Handling Stability>

Each test tire was mounted on the rear wheel of a 1300 CC motorcycle. (Tire pressure 290 kPa) Then, during running on a dry asphalt road surface of a circuit test course, a test rider evaluated the ride comfort based on shocks and vibrations when passing over seams of the asphalt and rough road surfaces. Further, the test rider evaluated the handling stability based on handle response, rigid feeling, grip, stability on rough road surfaces, and transitional characteristics.

The results are indicated in Table 1 by an index based on comparative example tire Ref. 1 being 100, wherein the larger the value, the better the performance.

<Wet Performance>

Using the above-mentioned motorcycle, the test rider evaluated the wet performance based on road-gripping feeling when running on a wet asphalt road surface of a test course covered with 5 mm depth water.

The results are indicated in Table 1 by an index based on Comparative example tire Ref. 1 being 100, wherein the larger the value, the better the performance.

TABLE 1

| Tire | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| narrow oblique groove | none | | | | | | | | | |
| angle α (deg.) | — | 25 | 0 | 35 | 45 | 25 | 25 | 25 | 25 | 25 |
| groove depth D2/D1 (%) | — | 50 | 50 | 50 | 50 | 20 | 30 | 70 | 80 | 50 |
| groove width W15 (mm) | — | 1.8 | 1.8 | 1.8 | 1.8 | 1.8 | 1.8 | 1.8 | 1.8 | 1.0 |
| W15/W11 (%) | — | 30 | 30 | 30 | 30 | 30 | 30 | 30 | 30 | 17 |
| distance D (mm) | — | 30 | 30 | 30 | 30 | 30 | 30 | 30 | 30 | 30 |
| land ratio S1 (%) | 92 | 90 | 90 | 90 | 90 | 90 | 90 | 90 | 90 | 90 |
| land ratio S2 (%) | 86 | 84 | 84 | 84 | 84 | 84 | 84 | 84 | 84 | 84 |
| land ratio S3 (%) | 87 | 87 | 87 | 87 | 87 | 87 | 87 | 87 | 87 | 87 |
| land ratio S4 (%) | 92 | 92 | 92 | 92 | 92 | 92 | 92 | 92 | 92 | 92 |
| land ratio S5 (%) | 96 | 96 | 96 | 96 | 96 | 96 | 96 | 96 | 96 | 96 |
| ride comfort | 100 | 115 | 118 | 110 | 105 | 105 | 110 | 113 | 115 | 110 |
| handling stability | 100 | 115 | 110 | 115 | 115 | 108 | 110 | 108 | 105 | 110 |
| wet performance | 100 | 110 | 110 | 105 | 100 | 105 | 107 | 115 | 115 | 105 |

| Tire | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| narrow oblique groove | | | | | | | | | |
| angle α (deg.) | 25 | 25 | 25 | 25 | 25 | 25 | 25 | 25 | 25 |
| groove depth D2/D1 (%) | 50 | 50 | 50 | 50 | 50 | 50 | 50 | 50 | 50 |
| groove width W15 (mm) | 1.5 | 2.5 | 3.0 | 1.8 | 1.8 | 1.8 | 1.8 | 1.8 | 1.8 |
| W15/W11 (%) | 25 | 42 | 50 | 30 | 30 | 30 | 30 | 30 | 30 |
| distance D (mm) | 30 | 30 | 30 | 10 | 20 | 30 | 30 | 30 | 30 |
| land ratio S1 (%) | 90 | 90 | 90 | 90 | 90 | 70 | 85 | 86 | 90 |
| land ratio S2 (%) | 84 | 84 | 84 | 84 | 84 | 77 | 82 | 88 | 82 |
| land ratio S3 (%) | 87 | 87 | 87 | 87 | 87 | 87 | 87 | 89 | 87 |
| land ratio S4 (%) | 92 | 92 | 92 | 92 | 92 | 92 | 92 | 92 | 92 |
| land ratio S5 (%) | 96 | 96 | 96 | 96 | 96 | 96 | 96 | 96 | 96 |
| ride comfort | 112 | 115 | 118 | 120 | 118 | 118 | 115 | 118 | 118 |
| handling stability | 112 | 110 | 105 | 105 | 110 | 100 | 105 | 113 | 107 |
| wet performance | 107 | 110 | 113 | 115 | 112 | 120 | 115 | 112 | 115 |

D1 = 7.2 mm

From the test results, it was confirmed that, in comparison with comparative tire Ref. 1, the performances of Embodiment tires were improved in good balance.

While detailed description has been made of an especially preferable embodiment of the present invention, the present invention can be embodied in various forms without limited to the illustrated embodiment.

REFERENCE SIGNS LIST

1 pneumatic motorcycle tire
2 tread portion
2A right half tread
2B left half tread
10 unit pattern
11 first oblique groove
11i axially inner end of first oblique groove
12 second oblique groove
13 third oblique groove
14 fourth oblique groove
14i axially inner end of fourth oblique groove
15 narrow oblique groove

The invention claimed is:

1. A pneumatic motorcycle tire comprising
a tread portion having right and left tread edges and provided with a unidirectional tread pattern having an intended tire rotational direction,
wherein
a right half tread of the tread portion defined between a tire equator and the right tread edge and a left half tread of the tread portion defined between the tire equator and the left tread edge are each provided with a unit pattern repeatedly arranged in the tire circumferential direction so as to form the unidirectional tread pattern, and
the unit pattern comprises
a first oblique groove extending axially outwardly from the tire equator, while inclining to the opposite direction to the intended tire rotational direction,
a second oblique groove disposed on a heel-side in the intended tire rotational direction of the first oblique groove and extending along the first oblique groove,
a third oblique groove disposed on the heel-side in the intended tire rotational direction of the second oblique groove and extending along the second oblique groove,
a fourth oblique groove disposed on the heel-side in the intended tire rotational direction of the third oblique groove and extending along the third oblique groove,
a straight narrow oblique groove extending from an axially inner end of the first oblique groove to an axially inner end of the fourth oblique groove, while inclining to the intended tire rotational direction, and
a fifth oblique groove disposed axially inside said straight narrow oblique groove and extending axially inwardly along an extension of an axially inner linear part of the third oblique groove so as to terminate without reaching to the tire equator,
said second oblique groove has an axially inner end terminated adjacently to said straight narrow oblique groove and not connected thereto,
said third oblique groove has an axially inner end terminated adjacently to said straight narrow oblique groove and not connected thereto, and
said fifth oblique groove has an axially outer end terminated adjacently to said straight narrow oblique groove and not connected thereto,
when a developed axial width of each of the right and left half treads is divided into five equal parts which are a first region, a second region, a third region, a fourth region and a fifth region arranged in this order from the tire equator to the tread edge, said narrow oblique groove extends obliquely from the first region to the second region, and
said first oblique groove extends axially outwardly to the fifth region.

2. The pneumatic motorcycle tire according to claim 1, wherein an angle of the narrow oblique groove with respect to the tire circumferential direction is in a range of more than 0 degree and not more than 35 degrees.

3. The pneumatic motorcycle tire according to claim 1, wherein a groove depth of the narrow oblique groove is in a range of from 30% to 70% of a groove depth of the first oblique groove.

4. The pneumatic motorcycle tire according to claim 1, wherein a groove width of the narrow oblique groove is in a range of from 1.5 to 2.5 mm.

5. The pneumatic motorcycle tire according to claim 1, wherein an axial distance from the tire equator to the axially inner end of the fourth oblique groove is not less than 20 mm.

6. The pneumatic motorcycle tire according to claim 1, wherein
in each of the right and left half treads, land ratios S1, S2, S3, S4 and S5 (%) of the respective first-fifth regions satisfy the following conditions (1)-(4):

$$S1 >= 85 \tag{1}$$

$$S1 > S2 \tag{2}$$

$$S1 - S2 =< 7 \text{ and} \tag{3}$$

$$S2 < S3 < S4 < S5. \tag{4}$$

7. The pneumatic motorcycle tire according to claim 2, wherein a groove depth of the narrow oblique groove is in a range of from 30% to 70% of a groove depth of the first oblique groove.

8. The pneumatic motorcycle tire according to claim 2, wherein a groove width of the narrow oblique groove is in a range of from 1.5 to 2.5 mm.

9. The pneumatic motorcycle tire according to claim 3, wherein a groove width of the narrow oblique groove is in a range of from 1.5 to 2.5 mm.

10. The pneumatic motorcycle tire according to claim 2, wherein an axial distance from the tire equator to the axially inner end of the fourth oblique groove is not less than 20 mm.

11. The pneumatic motorcycle tire according to claim 3, wherein an axial distance from the tire equator to the axially inner end of the fourth oblique groove is not less than 20 mm.

12. The pneumatic motorcycle tire according to claim 4, wherein an axial distance from the tire equator to the axially inner end of the fourth oblique groove is not less than 20 mm.

13. The pneumatic motorcycle tire according to claim 2, wherein
in each of the right and left half treads, land ratios S1, S2, S3, S4 and S5 (%) of the respective first-fifth regions satisfy the following conditions (1)-(4):

$$S1 >= 85 \tag{1}$$

$$S1 > S2 \tag{2}$$

$$S1 - S2 =< 7 \text{ and} \tag{3}$$

$$S2 < S3 < S4 < S5. \tag{4}$$

14. The pneumatic motorcycle tire according to claim 3, wherein
in each of the right and left half treads, land ratios S1, S2, S3, S4 and S5 (%) of the respective first-fifth regions satisfy the following conditions (1)-(4):

$$S1 >= 85 \tag{1}$$

$$S1 > S2 \tag{2}$$

$$S1 - S2 =< 7 \text{ and} \tag{3}$$

$$S2 < S3 < S4 < S5. \tag{4}$$

15. The pneumatic motorcycle tire according to claim 4, wherein
in each of the right and left half treads, land ratios S1, S2, S3, S4 and S5 (%) of the respective first-fifth regions satisfy the following conditions (1)-(4):

$$S1 >= 85 \tag{1}$$

$$S1 > S2 \tag{2}$$

$$S1 - S2 =< 7 \text{ and} \tag{3}$$

$$S2 < S3 < S4 < S5. \tag{4}$$

16. The pneumatic motorcycle tire according to claim 5, wherein
in each of the right and left half treads, land ratios S1, S2, S3, S4 and S5 (%) of the respective first-fifth regions satisfy the following conditions (1)-(4):

$$S1 >= 85 \tag{1}$$

$$S1 > S2 \tag{2}$$

$$S1 - S2 =< 7 \text{ and} \tag{3}$$

$$S2 < S3 < S4 < S5. \tag{4}$$

17. The pneumatic motorcycle tire according to claim 1, wherein the first oblique groove is longer than the second oblique groove, the second oblique groove is longer than the third oblique groove, and the third oblique groove is longer than the fourth oblique groove.

18. The pneumatic motorcycle tire according to claim 17, wherein
the unit pattern further includes:
a sixth oblique groove disposed axially outside the second oblique groove so as to extend axially outwardly along an extension of an axially outer linear part of the second oblique groove and terminate without reaching to the tread edge,
a seventh oblique groove disposed axially outside the third oblique groove so as to extend axially outwardly along an extension of an axially outer linear part of the third oblique groove and terminate without reaching to the tread edge, and
an eighth oblique groove disposed axially outside the fourth oblique groove so as to extend axially outwardly along an extension of the fourth oblique groove and terminate without reaching to the tread edge.

19. The pneumatic motorcycle tire according to claim 17, wherein
in each of the right and left half treads,
an axially inner end portion of the first oblique groove is curved and said axially inner end of the first oblique groove is positioned in the first region, and said axially inner end of the fourth oblique groove is positioned in the vicinity of the boundary between the second region and the third region.

20. The pneumatic motorcycle tire according to claim 1, wherein in each of the right and left half treads, an axially inner end portion of the first oblique groove is curved and said axially inner end of the first oblique groove is positioned in the first region, and said axially inner end of the fourth oblique groove is positioned in the vicinity of the boundary between the second region and the third region.

21. The pneumatic motorcycle tire according to claim 8, wherein the narrow oblique groove has said groove width which is constant.

22. The pneumatic motorcycle tire according to claim 4, wherein the narrow oblique groove has said groove width which is constant.

\* \* \* \* \*